(12) United States Patent
Fujita

(10) Patent No.: US 7,890,239 B2
(45) Date of Patent: Feb. 15, 2011

(54) VEHICLE SUPPRESSING OS OR US BY STAGEDLY DIFFERENT DEVICES

(75) Inventor: Yoshitaka Fujita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 557 days.

(21) Appl. No.: 11/541,558

(22) Filed: Oct. 3, 2006

(65) Prior Publication Data

US 2007/0088484 A1 Apr. 19, 2007

(30) Foreign Application Priority Data

Oct. 13, 2005 (JP) .............................. 2005-298739

(51) Int. Cl.
*B62D 6/00* (2006.01)
*G06F 7/70* (2006.01)

(52) U.S. Cl. .............................. 701/70; 701/41; 701/93; 340/438; 475/8

(58) Field of Classification Search .................. 701/93, 701/70, 41; 340/438; 475/8, 18, 19; 477/1; 342/70, 71
See application file for complete search history.

(56) References Cited

U.S. PATENT DOCUMENTS

| | | | | |
|---|---|---|---|---|
| 3,586,117 A * | 6/1971 | Le Tourneau | .............. | 180/204 |
| 4,011,563 A * | 3/1977 | Robbi | .............. | 342/128 |
| 4,941,095 A | 7/1990 | Imaseki et al. | | |
| 5,001,636 A * | 3/1991 | Shiraishi et al. | ............ | 701/41 |
| 5,265,019 A * | 11/1993 | Harara et al. | ............ | 701/41 |
| 5,297,646 A * | 3/1994 | Yamamura et al. | ......... | 180/415 |
| 5,471,390 A * | 11/1995 | Sasaki | ............ | 701/78 |
| 5,648,903 A * | 7/1997 | Liubakka | ............ | 701/41 |
| 5,702,165 A * | 12/1997 | Koibuchi | ............ | 303/146 |
| 5,805,449 A * | 9/1998 | Ito | ............ | 701/41 |
| 6,033,337 A * | 3/2000 | Ohkuma et al. | ............ | 477/1 |
| 6,094,614 A * | 7/2000 | Hiwatashi | ............ | 701/89 |
| 6,324,458 B1 * | 11/2001 | Takagi et al. | ............ | 701/70 |
| 6,360,150 B1 * | 3/2002 | Fukushima et al. | ............ | 701/41 |
| 6,390,568 B1 * | 5/2002 | Tozu et al. | ............ | 303/114.3 |

(Continued)

FOREIGN PATENT DOCUMENTS

DE 38 32 924 A1 4/1989

(Continued)

OTHER PUBLICATIONS

German Office Action with English translation dated Sep. 1, 2009.

*Primary Examiner*—Khoi Tran
*Assistant Examiner*—Kyung J Kim
(74) *Attorney, Agent, or Firm*—Oliff & Berridge, PLC

(57) ABSTRACT

To suppress an oversteered condition or an understeered condition by letting the movement of the vehicle follow the operational intention of the driver as faithfully as possible by making the best use of the respective characteristics of changes of the driving force distribution between front and rear wheels, modification of the steering angle and selective braking of a selected wheel or wheels under a simple control calculation, a change of the driving force distribution between the front and rear wheels is first executed according to the progress of the oversteered or understeered condition, and when it further progresses, a modification of the steering angle, and further a selected braking of a selected wheel or wheels is further executed.

5 Claims, 3 Drawing Sheets

U.S. PATENT DOCUMENTS

| | | | |
|---|---|---|---|
| 6,415,215 B1 * | 7/2002 | Nishizaki et al. | 701/70 |
| 6,564,140 B2 * | 5/2003 | Ichikawa et al. | 701/91 |
| 6,925,371 B2 * | 8/2005 | Yasui et al. | 701/72 |
| 7,050,896 B2 * | 5/2006 | Tsuchiya | 701/41 |
| 7,493,984 B2 * | 2/2009 | Ono et al. | 180/404 |
| 2002/0007239 A1 * | 1/2002 | Matsumoto et al. | 701/41 |
| 2002/0029922 A1 * | 3/2002 | Richardson et al. | 180/444 |
| 2003/0218378 A1 * | 11/2003 | Tanaka et al. | 303/146 |
| 2004/0267427 A1 * | 12/2004 | Suzuki et al. | 701/69 |
| 2005/0049769 A1 * | 3/2005 | Tsuchiya | 701/41 |
| 2005/0125131 A1 * | 6/2005 | Kato et al. | 701/70 |
| 2005/0209763 A1 * | 9/2005 | Offerle et al. | 701/83 |
| 2005/0216156 A1 * | 9/2005 | Asano | 701/41 |
| 2005/0256622 A1 | 11/2005 | Futterer et al. | |
| 2006/0052201 A1 * | 3/2006 | Augustine et al. | 475/19 |
| 2006/0074541 A1 * | 4/2006 | Ono et al. | 701/80 |
| 2009/0037053 A1 * | 2/2009 | Yamazaki | 701/41 |

FOREIGN PATENT DOCUMENTS

| | | |
|---|---|---|
| DE | 41 12 582 A1 | 10/1991 |
| DE | 101 38 168 A1 | 4/2002 |
| DE | 102 26 683 A1 | 12/2003 |
| DE | 103 38 706 A1 | 3/2004 |
| EP | 1 251 060 A2 | 10/2002 |
| EP | 1 357 008 A2 | 10/2003 |
| EP | 1 657 138 A1 | 5/2006 |
| JP | A 05-278488 | 10/1993 |
| JP | A 2003-159966 | 6/2003 |

* cited by examiner

VEHICLE SUPPRESSING OS OR US BY STAGEDLY DIFFERENT DEVICES

BACKGROUND OF THE INVENTION

1. Field of the Invention

The present invention relates to suppressing an oversteer (OS) or an understeer (US) in the turn running of the vehicle.

2. Description of the Prior Art

It is known in the art of vehicles that when the vehicle is in an oversteered condition, such a condition is suppressed by the distribution of the driving force between the front and rear wheels being shifted forward so that the driving force of the front wheels is increased relative to that of the rear wheels, while when the vehicle is in an understeered condition, such a condition is suppressed by the distribution of the driving force between the front and rear wheels being shifted rearward so that the driving force of the rear wheels is increased relative to that of the front wheels, provided that the distribution of the driving force between the front and rear wheels is variable.

It is also known in this art that when the vehicle is in an oversteered or an understeered condition, such a condition is suppressed by the steering angle by the driver being modified by an electronic control unit (CPU) incorporating a microcomputer in being transmitted to the steered wheels.

Further, it is also known in this art that, when the respective wheels of the vehicle can each be selectively braked under the control of an electronic control unit, an oversteered condition is suppressed by the front wheel serving at the outside of the turn being braked, while an understeered condition is suppressed by the rear wheels, particularly the rear wheel serving at the inside of the turn being braked.

In Japanese Patent Laid-open Publication 2003-159966, it is described that, in order to control the running movement of the vehicle to be always most appropriate in spite of changes of the running conditions of the vehicle, particularly changes of the performance of the behavior control device in controlling the running movement of said vehicle by a plurality of behavior control devices, the target longitudinal force, the target lateral force and the target yaw moment are calculated, control responsive frequency characteristic values of the steering control device and the driving/braking force control device are calculated with respect to each wheel, weighting factors proportional to a reciprocal of each frequency characteristic value is calculated, the target slip ratios and the target slip angles of the respective wheels are calculated by a distribution control using a judging function based upon the weighting factors, and the steering angles and the braking pressures of the respective wheels and the engine output torque are controlled to accomplish the target slip ratios and the target slip angles.

SUMMARY OF THE INVENTION

Although it would be possible to properly suppress an oversteer or an understeer of the vehicle by the changes of the driving force distribution between the front and rear wheels, the modification of the steering angle and the selective braking of the selected wheel or wheels being executed in parallel by making the best use of the respective control devices, since these control devices interfere with each other, the oversteer or understeer suppress control by a parallel operation of these control devices will need highly complicated calculations as described in the above mentioned publication.

On the other hand, considering from the view point of suppressing an oversteered condition or an understeered condition while letting the movement of the vehicle follow the driver's operational intention, it is to be noted that there is an order of priority among the changes of the driving force distribution between the front and rear wheels, the modification of the steering angle, and the selective braking of the selected wheel or wheels. In more detail, first, if it is only the changes of the driving force distribution between the front and rear wheels, since the sum of the driving forces of the front and rear wheels is not changed for suppressing an oversteered or an understeered condition, an oversteer or an understeer of the vehicle can be suppressed without interfering with the driver's operational intention expressed by the depression of the accelerator pedal by the driver. Therefore, if an oversteered or an understeered condition can be suppressed by the changes of the driving force distribution between the front and rear wheels, first of all this control is to be executed.

The modification of the steering angle is to decrease the steering angle of the steered wheels relative to the steering angle given by the driver with a modification decrement, and therefore interferes with the driver's steering operation with a probability of giving an unpleasant feeling to the driver. However, when compared with the selective braking of a selected wheel or wheels which brakes the vehicle irrespective of the operation of the brake pedal by the driver, the modification of the steering angle is less disturbing to the operational intention of the driver.

Based upon the above recognition, it is the object of the present invention to suppress an oversteered condition or an understeered condition of the vehicle by letting the movement of the vehicle follow the operational intention of the driver as faithfully as possible by making the best use of the respective characteristics of the changes of the driving force distribution between the front and rear wheels, the modification of the steering angle and the selective braking of a selected wheel or wheels under a simple control calculation.

In order to accomplish the above mentioned object, the present invention proposes a vehicle comprising a turning behavior detecting device for detecting at least either of an oversteered condition or an understeered condition of the vehicle in a turn running thereof, a driving force distributing device for distributing a driving force between front and rear wheels, and a steering angle modifying device for modifying a steering angle input by a driver, wherein when at least either of the oversteered condition or the understeered condition of the vehicle detected by the turning behavior detecting device is above a first determined standard condition but not above a second determined standard condition more promoted from the first standard condition, the driving force distribution between the front and rear wheels is changed by the driving force distributing device so that the oversteered or the understeered condition is suppressed, and when the oversteered or the understeered condition of the vehicle is above the second standard condition, the steering angle input by the driver is modified by the steering angle modifying device so that the oversteered or the understeered condition of the vehicle is suppressed.

When the vehicle is so constructed as described above, an oversteered or an understeered condition of the vehicle of such a relatively light degree that is above the first standard condition but not above the second standard condition and can be suppressed by the driving force distribution between the front and rear wheels being appropriately changed is suppressed only by an appropriate change of the driving force distribution between the front and rear wheels by the driving force distributing device with no change in the total driving force and therefore not substantially disturbing the operational intention of the driver, while when the oversteered or the understeered condition has promoted so far as to be above the second standard condition, the oversteered or the understeered condition can be suppressed further by a modification of the steering angle by the steering angle modifying device in addition to the best oversteer or understeer suppress control by the driving force distributing device, when the first and second standard conditions are appropriately determined.

In addition to the above mentioned construction, the vehicle according to the present invention may further comprise a braking control device for selectively braking a selected wheel or wheels, so that when the oversteered or the understeered condition is above a third determined standard condition more promoted from the second standard condition, a selected wheel or wheels are selectively braked by the braking control device so as to suppress the oversteered or the understeered condition.

According to the above-mentioned construction, when the oversteered or the understeered condition has further promoted so far as to be above the third standard condition, the oversteered or the understeered condition can be suppressed further by a selected wheel or wheels being selectively braked by the braking control device in addition to the best oversteer or understeer suppress control by the changes of the driving force distribution between the front and rear wheels by the driving force distributing device and the best oversteer or understeer suppress control by the modification of the steering angle by the steering angle modifying device, when the third standard condition is appropriately determined in addition to the first and second standard conditions.

The changes of the driving force distribution between the front and rear wheels by the driving force distributing device, the modification of the steering angle by the steering angle modifying device and the selective braking of the selected wheel or wheels by the braking control device may be made variably according to the promotion of the oversteered or the understeered condition of the vehicle.

By such an arrangement, the oversteer or understeer suppress control by the changes of the driving force distribution between the front and rear wheels, the modification of the steering angle or the selective braking of a selected wheel or wheels is executed properly according to the promotion of the oversteered or the understeered condition of the vehicle.

BRIEF DESCRIPTION OF THE DRAWINGS

In the accompanying drawings.

DESCRIPTION OF THE EMBODIMENTS

In the following, the present invention will be described in more detail in the form of some preferred embodiments with reference to the accompanying drawings.

Figure 1:
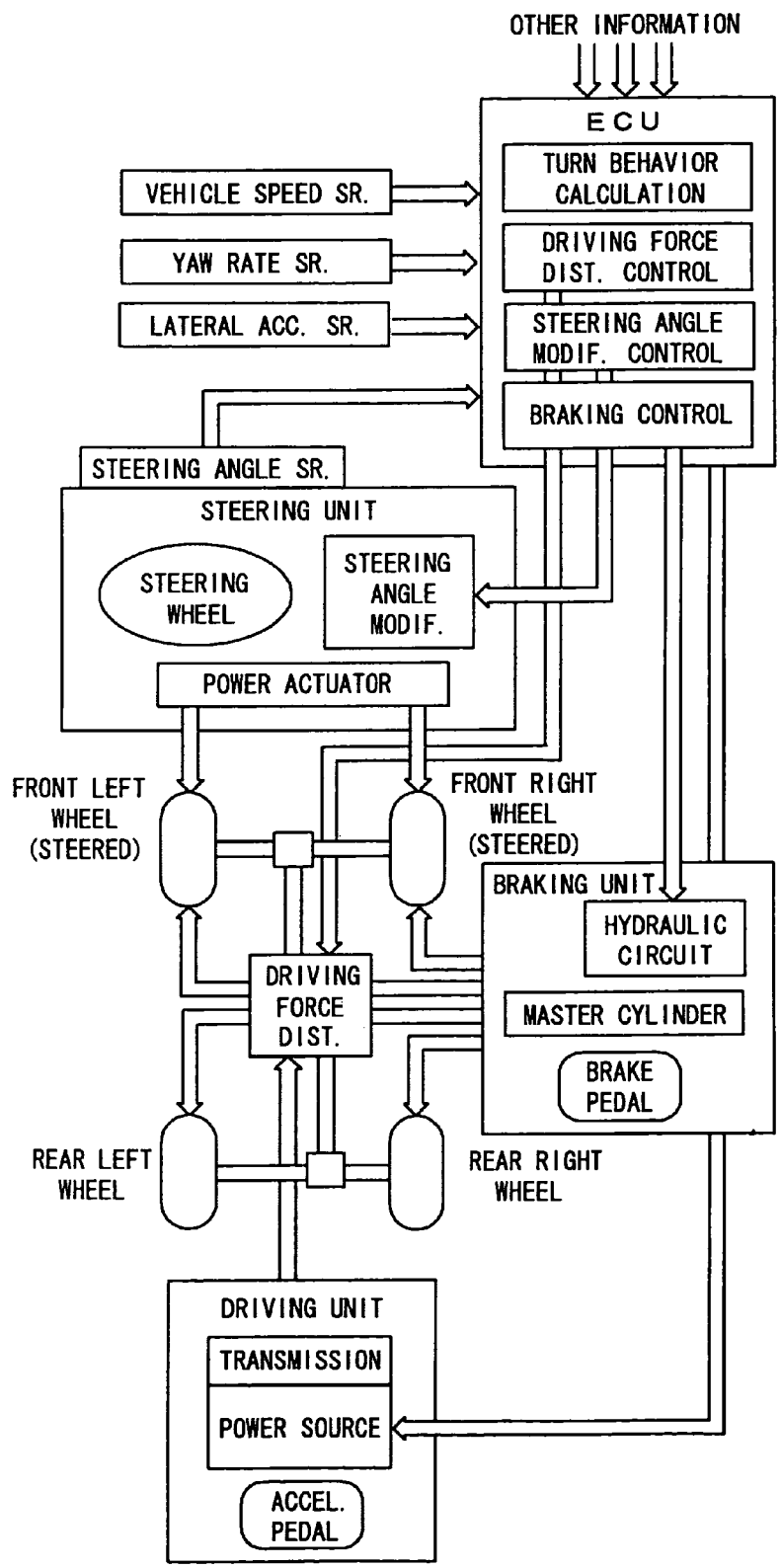
FIG. 1 is a diagrammatic view of a vehicle according to the present invention, showing the constructions of the vehicle for totally accomplishing the controls available by the present invention.

In FIG. 1, there is diagrammatically shown the vehicle according to the present invention as an embodiment thereof to comprise at turning behavior detecting device for detecting both of an oversteered condition and an understeered condition in a turn running of the vehicle, a driving force distributing device for distributing the driving force between the front and rear wheels, a steering angle modifying device for modifying the steering angle input by the steering operation of the driver, and a braking control device for selectively braking a selected wheel or wheels, and adapted to suppress an oversteered condition or an understeered condition by changing the driving force distribution between the front and rear wheels by the driving force distributing device when the oversteered condition or the understeered condition detected by the turning behavior detecting device is above a first determined standard condition but not above a second determined standard condition more promoted from the first standard condition, by further modifying the steering angle by the steering operation of the driver when the oversteered condition or the understeered condition detected by the turning behavior detecting device is above the second standard condition but not above a third determined standard condition more promoted from the second standard condition, and by further selectively braking a selected wheel or wheels by the braking control device when the oversteered condition or the understeered condition detected by the turning behavior detecting device is above the third standard condition. However, the present invention is a matter of software regarding the control of the vehicle, and therefore, the hardware constructions herein shown are already known.

The vehicle shown in FIG. 1 is a four-wheel drive vehicle in which the front left and front right wheels and the rear left and rear right wheels are driven with a variable distribution of the driving force between the front and rear wheels under the control of the central driving force distributing device. The front left and front right wheels are steered wheels. A vehicle body not shown in the figure and supported by those four wheels is equipped with a steering unit, a driving unit, a braking unit and an electronic control unit (ECU) which themselves are known in various constructions.

The steering unit includes a steering wheel, a power actuator and a steering angle modifying device, and is adapted to steer the front left and front right wheels according to a rotating operation of the steering wheel by the driver via the power actuator, while automatically modifying the steering angle of the steered front left and front right wheels from the steering angle input by the steering operation of the driver by the steering angle modifying device.

The driving unit includes a power source such as an engine, a variable transmission and an accelerator pedal, and it is so adapted that the output of the powers source is controlled according to the depression of the accelerator pedal by the driver and a control signal from the electronic control unit.

The braking unit includes a master cylinder, a hydraulic circuit incorporating oil pressure control valves, and a brake pedal, and it is so adapted that the four wheels are simultaneously braked according to a depression of the brake pedal by the driver, while each of the front left and front right wheels and the rear left and rear right wheels is independently braked according to the control signal from the electronic control unit.

The electronic control unit is substantially constructed by a microcomputer, and includes a turn behavior calculating portion concerned with the present invention as a portion of its calculating/controlling functions. The electronic control unit is supplied with a signal indicating vehicle speed from a vehicle speed sensor, a signal indicating yaw rate of the vehicle body from a yaw rate sensor, a signal indicating lateral acceleration of the vehicle body from a lateral acceleration sensor, a signal indicating steering angle by the steering wheel from a steering angle sensor and other various signals indicating other information as required, executes various control calculations based upon these input signals according to the control programs stored in the microcomputer, changes the driving force distribution between the front and rear wheels by controlling the driving force distributing device through a driving force distribution control portion, modifies the steering angle of the steered wheels from the steering angle input by the driver by controlling the steering angle modifying device through a steering angle modification control portion, and selectively brakes a selected wheel or wheels individually by controlling the hydraulic circuit through a braking control portion, in addition to other various control operations for driving the vehicle such as the automatic control of the output of the power source for the behavior control of the vehicle.

Figure 2:
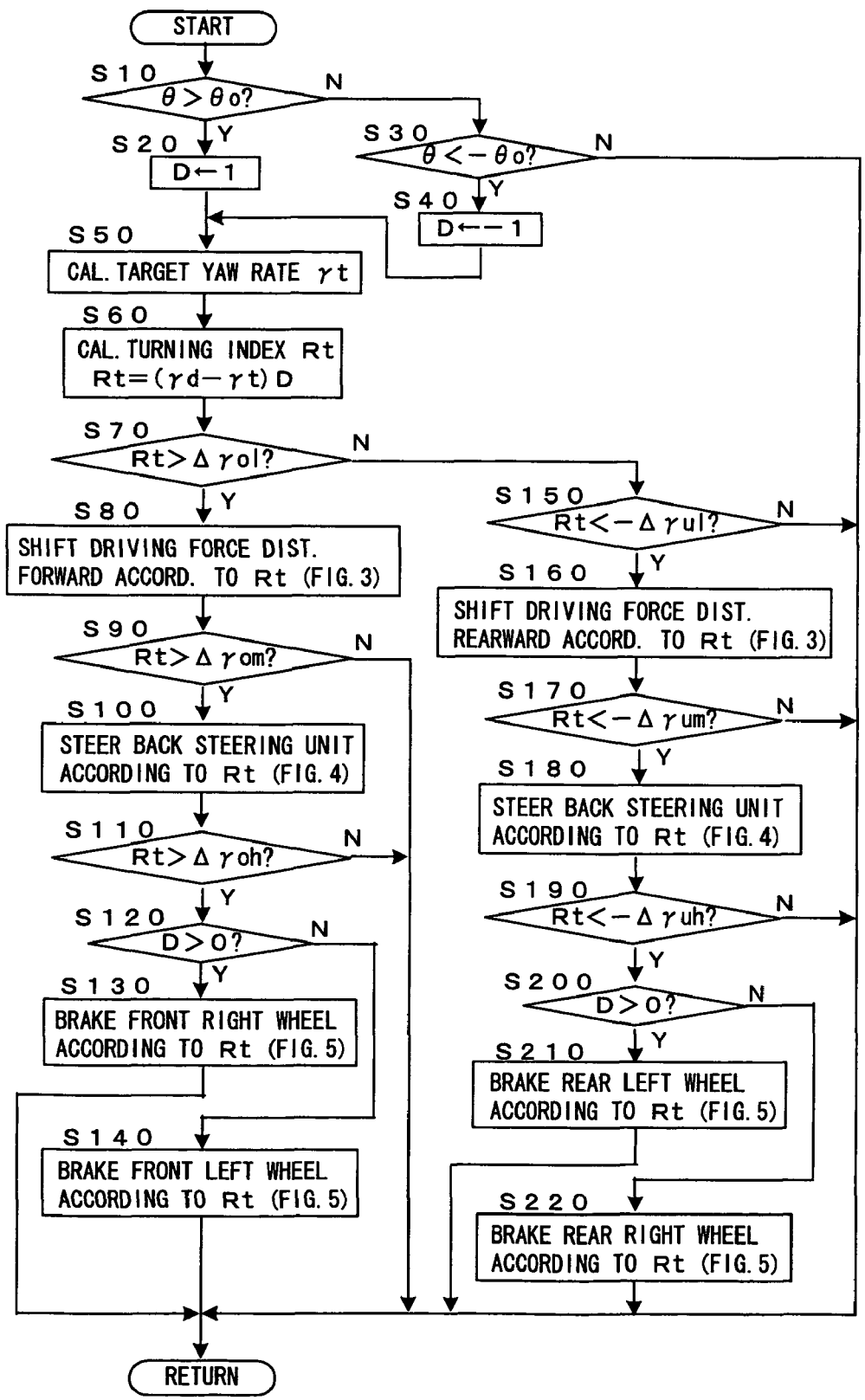
FIG. 2 is a flowchart showing an embodiment of the controls available in the vehicle according to the present invention to control both of an oversteer condition and an understeering condition.

FIG. 2 is a flowchart showing in the form of an embodiment the overall construction of the controls available according to the present invention by the means for distributing the driving force between the front and rear wheels constructed by the driving force distribution control portion and the driving force distributing device, the means for modifying the steering angle constructed by the steering angle modification control portion and the steering angle modifying device, and the means for controlling the braking constructed by the brake control potion and the hydraulic circuit shown in FIG. 1 for suppressing both of an oversteered condition and an understeered condition. The control according to this flowchart may be repeated at a cycle time of tens to hundreds milliseconds during the operation of the vehicle.

When the control is started, in step 10 it is judged if the steering angle $\theta$ detected by the steering angle sensor is larger than a determined lower limit value $\theta o$. The steering angle $\theta$ is made positive when the vehicle is steered to turn leftward, and negative when the vehicle is steered to turn rightward. The lower limit value $\theta o$ is the absolute value of a steering angle above which an oversteered condition or an understeered condition might occur, and therefore, a positive value which expresses a lower limit of the steering angle to become the object of the control according to the present invention. When the answer is yes (Y), the controlled proceeds to step 20, and the value of D is set to 1. When the answer is no (N), the control proceeds to step 30, and it is judged if the steering angle $\theta$ is less than $-\theta o$ or not. When the answer is yes, the control proceeds to step 40, and the value of D is set to $-1$. When the answer of step 30 is no, it means that there is no much steering in both of leftward and rightward directions, so in this case the control according to this flowchart is ended.

From step 20 or 40, the control proceeds to step 50, and the yaw rate of the vehicle body due at this time, i.e. the target yaw rate $\gamma t$, is calculated in the following manner by expressing the steering angle detected by the steering angle sensor as $\theta$, the vehicle speed detected by the vehicle speed sensor as V, the lateral acceleration acting to the vehicle body detected by the lateral acceleration sensor as Gy, the gear ratio of the steering unit as N, the wheel base as L, and the stability factor as Kh:

$\gamma t = \{1/(1+Kh \cdot V^2)\} V \cdot \theta / (N \cdot L)$ $Gy = \gamma t \cdot V$ From the above two equations, $\gamma t = V \cdot \theta / (N \cdot L) - Kh \cdot Gy \cdot V$ Then the control proceeds to step 60, and regardless if the turn is a left turn or a right turn, by comparing the actual yaw rate of the vehicle body detected by the yaw rate sensor with the target yaw rate, a turn index Rt is calculated as shown hereinunder to indicate if the vehicle is in an oversteered condition or an understeered condition with a degree thereof When this value is positive, the vehicle is in an oversteered condition, while when this value is negative, the vehicle is in an understeered condition, and in either case the oversteered or the understeered condition is more promoted as the absolute value thereof is larger:

$Rt = (\gamma d - \gamma t) D$

Then the control proceeds to step 70, and it is judged if Rt is larger than a determined positive lower limit value $\Delta \gamma$ ol or not. When the answer is yes, it means that the vehicle is in an oversteered condition. Herein $\Delta \gamma$ ol is set to such a value that indicates that the degree of the oversteer is above a lower limit condition in which it is desirable that the driving force distribution is shifted forward. When the answer is yes, the control proceeds to step 80.

Figure 3:
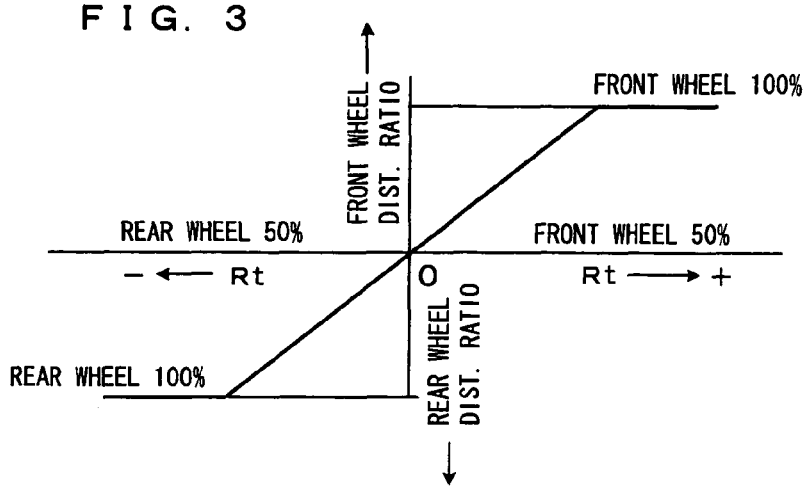
FIG. 3 is a map referred to in the control of steps 80 and 160 of FIG. 2.

In step 80, a control is executed so as to change the driving force distribution between the front and rear wheels forward according to the value of Rt. The degree of the change may be determined by referring to a map such as exemplarily shown in FIG. 3 according to the value of Rt. Then the control proceeds to step 90.

In step 90, it is judged if the value of Rt is larger than $\Delta \gamma$ om or not. $\Delta \gamma$ om is set to such a positive value larger than $\Delta \gamma$ ol that indicates that the degree of the oversteered condition is above a lower limit in which it is desirable that the steering back control by the steering modification device is executed. When the answer is yes, the control proceeds to step 100.

Figure 4:
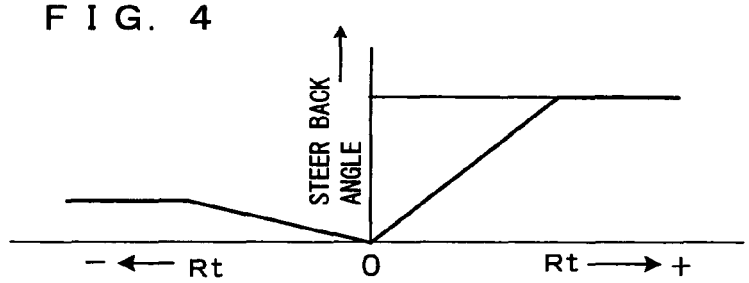
FIG. 4 is a map referred to in the control of steps 100 and 180 of FIG. 2.

In step 100, a steering modification control is executed to steer back the steering angle according to the value of Rt. The degree of steering back of the steering angle may be determined by referring to a map such as shown in FIG. 4 according to the value of Rt. Then the control proceeds to step 110.

In step 110, it is judged if the value of Rt is larger than $\Delta \gamma$ oh or not. $\Delta \gamma$ oh is set to such a positive value larger than $\Delta \gamma$ om that indicates that the oversteer is above a lower limit in which it is desirable that a selected wheel or wheels are braked. When the answer is yes, the control proceeds to step 120.

Figure 5:
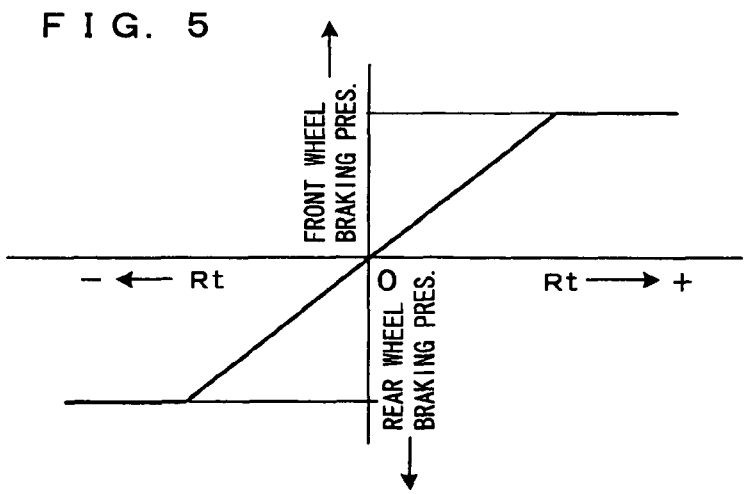
FIG. 5 is a map referred to in the control of steps 130, 140, 210 and 220 of FIG. 2.

In step 120, it is judged if D is positive or not. When the vehicle is turning to the left, the answer is yes. In this case, the control proceeds to step 130, and the front right wheel is braked according to the value of Rt. The degree of the braking may be determined by referring to a map such as exemplarily shown in FIG. 5 according to the value of Rt.

When the answer of step 120 is no, it means that the vehicle is turning to the right. In this case, the control proceeds to step 140, and the front left wheel is brake according to the value of Rt. The degree of the braking may also be determined by referring to the map of FIG. 5 according to the value of Rt.

The braking for suppressing the oversteer need not be limited to the front wheel serving at the outside of the turn but may be executed for a plurality of wheels including the rear wheel serving at the outside of the turn.

When the answer of step 70 is no, the control proceeds to step 150, and it is judged if Rt is less than $-\Delta \gamma$ ul or not by taking $\Delta \gamma$ ul as a determined positive value. When the answer is yes, it means that the vehicle is in an understeered condition. Herein $\Delta \gamma$ ul is set to such a value that indicates that the degree of the oversteer is above a lower limit condition in which it is desirable that the driving force distribution is more shifted rearward. When the answer is yes, the control proceeds to step 160.

In step 160, a control is executed so as to change the driving force distribution between the front and rear wheels rearward according to the value of Rt. The degree of the change may be determined by referring to a map such as exemplarily shown in FIG. 3 according to the value of Rt. Then the control proceeds to step 170.

In step 170, it is judged if the value of Rt is less than $-\Delta \gamma$ um or not. $\Delta \gamma$ um is set to such a positive value larger than $\Delta \gamma$ ul that indicates that the degree of the understeered condition is above a lower limit in which it is desirable that the steering further control by the steering modification device is executed. When the answer is yes, the control proceeds to step 180.

Although the yaw moment generated in the vehicle by the steering increases first according to the increase of the steering angle, there is a saturation angle determined according to the vehicle speed and the friction coefficient between the road surface and the tire, and when the steering angle increases beyond the saturation angle, the yaw moment by the steering does no longer increase but rather decreases. The fact that the vehicle is in an understeered condition means that the steering angle has exceeded such a saturation angle. Therefore, in step 180, a steering modification control is executed to steer back the steering angle according to the value of Rt. The degree of steering back of the steering angle may be determined by referring to a map such as shown in FIG. 4 according to the value of Rt. Then the control proceeds to step 190.

In step 190, it is judged if the value of Rt is less than $-\Delta \gamma$ uh or not. $\Delta \gamma$ uh is set to such a positive value larger than $\Delta \gamma$ um that indicates that the understeer is above a lower limit in which it is desirable that a selected wheel or wheels are braked. When the answer is yes, the control proceeds to step 200.

In step 200, it is judged if D is positive or not. When the vehicle is turning to the left, the answer is yes. In this case, the control proceeds to step 210, and the rear left wheel is braked according to the value of Rt. The degree of the braking may be determined by referring to a map such as exemplarily shown in FIG. 5 according to the value of Rt.

When the answer of step 200 is no, it means that the vehicle is turning to the right. In this case, the control proceeds to step 220, and the rear right wheel is brake according to the value of Rt. The degree of the braking may also be determined by referring to the map of FIG. 5 according to the value of Rt.

The braking for suppressing the understeer need not be limited to the rear wheel serving at the inside of the turn but may be executed for a plurality of wheels including the rear wheel serving at the outside of the turn and the front wheel serving at the inside of the turn.

Although the present invention has been described in detail with respect to some preferred embodiments thereof, it will be apparent for those skilled in the art that various modifications are possible with respect to the shown embodiments within the scope of the present invention.

The invention claimed is:

1. A vehicle comprising a turning behavior detecting device for detecting at least either of an oversteered condition or an understeered condition of the vehicle in a turn running thereof, a driving force distributing device for distributing an output of a power source between front and rear wheels, and a steering angle modifying device for modifying a steering angle input by a driver, wherein an order is predetermined between the driving force distributing device and the steering angle modifying device with regard to putting into operation according to either of the oversteered condition or the understeered condition of the vehicle such that when at least either of the oversteered condition or the understeered condition of the vehicle detected by the turning behavior detecting device is above a first determined standard condition but not above a second determined standard condition more promoted from the first standard condition, the driving force distributing device is given a priority over the steering angle modifying device, the distribution of the output of the power source between the front and rear wheels is changed by the driving force distributing device so that the oversteered or the understeered condition is suppressed, and when the oversteered or the understeered condition of the vehicle is above the second standard condition, the steering angle input by the driver is modified by the steering angle modifying device so that the oversteered or the understeered condition of the vehicle is suppressed.

2. A vehicle according to claim 1, further comprising a braking control device for selectively braking a selected wheel or wheels, so that when the oversteered or the understeered condition is above a third determined standard condition more promoted from the second standard condition, a selected wheel or wheels are selectively braked by the braking control device so as to suppress the oversteered or the understeered condition.

3. A vehicle according to claim 1, wherein the changes of the distribution of the output of the power source between the front and rear wheels by the driving force distributing device is made variably according to the promotion of the oversteered or the understeered condition of the vehicle.

4. A vehicle according to claim 1, wherein modification of the steering angle by the steering angle modifying device is made variably according to the promotion of the oversteered or the understeered condition of the vehicle.

5. A vehicle according to claim 2, wherein the selective braking of the selected wheel or wheels by the braking control device is made variably according to the promotion of the oversteered or the understeered condition of the vehicle.

* * * * *